United States Patent [19]

Komurasaki et al.

[11] Patent Number: 4,835,428
[45] Date of Patent: May 30, 1989

[54] SETTING DEVICE FOR VEHICLE GENERATOR

[75] Inventors: Keiichi Komurasaki; Hideyuki Hayashi, both of Hyogo, Japan

[73] Assignee: Mitsubishi Denki Kabushiki Kaisha, Tokyo, Japan

[21] Appl. No.: 250,640

[22] Filed: Sep. 29, 1988

[30] Foreign Application Priority Data

Sep. 29, 1987 [JP] Japan ................. 62-149408[U]

[51] Int. Cl.4 .......................................... H02K 11/00
[52] U.S. Cl. ................................. 310/68 D; 310/89; 310/91
[58] Field of Search ............. 310/89, 91, 68 R, 68 D; 411/956, 957, 965, 929

[56] References Cited

U.S. PATENT DOCUMENTS 917,188   4/1909  Tirrill ..................................... 310/91
4,757,221 7/1988  Kurihashi .............................. 310/89

Primary Examiner—Peter S. Wong
Assistant Examiner—Tien M. Nguyen
Attorney, Agent, or Firm—Sughrue, Mion, Zinn, Macpeak & Seas

[57] ABSTRACT

A setting device for a vehicle generator, comprises a stay attached to an engine of a vehicle and having a first through hole; a front attaching leg portion and a rear attaching leg portion of the vehicle generator, both provided on opposite sides of said stay, one of the front and rear attaching leg portions having a second through hole and the other having a fitting hole and a polygonal tube portion; a cylindrical attaching-span adjusting bush fitted movably in the fitting hole; a polygonal nut housed in the tube portion communicating with the fitting hole with a gap between the nut and the tube portion so as not to be rotatable and removable, the nut being coaxially adjacent to the attaching-span adjusting bush; and a bolt passed through the second through hole, the first through hole and the attaching-span adjusting bush so as to be fixed in the nut.

4 Claims, 3 Drawing Sheets

SETTING DEVICE FOR VEHICLE GENERATOR

BACKGROUND OF THE INVENTION

The present invention relates to a setting device for fixing a vehicle generator to an engine of a vehicle.

FIGS. 3 and 4 show conventional devices respectively. In FIG. 3, reference numeral 1 designates a generator mounted on an engine of a vehicle and constructed by parts described hereunder. Reference numeral 11 designates a front bracket, 111 each of front attaching leg portions of the generator 1 integrally formed with the front bracket 11 and each provided with a through hole 111a formed therein, 12 a core of an armature coil, and 13 a rear bracket. Reference numeral 131 designates each of rear attaching leg portions of the generator 1 integrally formed with the rear bracket 13 and each provided with a fitting hole 131a formed therein. Reference numeral 132 designates an attaching-span adjusting bush which is cylindrically shaped and has an inner loose through hole and which is pressed into the fitting hole 131a of each of the rear attaching leg portions 131 such that the bush 132 is movable in the press-in direction by the fastening force due to both of a bolt and a hexagon nut for fixing the generator 1, which will be described later. Reference numeral 14 designates a pulley coupled with a crank pulley of the engine of the vehicle through a belt so as to transmit the driving force of the engine to the generator 1. The exterior portion of the generator 1 is constructed by the front bracket 11, the core 12, the rear bracket 13, and the pulley 14. Reference numeral 2 designates a stay mounted on the engine of the vehicle for attaching the generator 1. The stay 2 has through holes 2a, and the attaching leg portions 111 and 131 are disposed on the opposite sides of the stay 2 respectively. Reference numeral 3 designates each of the bolts for fixing the generator 1 to the stay 2. Each bolt 3 is inserted through the through holes 111a and 2a and the bush 132 and engaged at its screw portion 3a with the hexagon nut 4.

In the arrangement described above, the attachment of the generator 1 to the engine is carried out in such a manner that the attaching-span adjusting bushes 132 are moved by the fastening force of the fixing bolts 3 and the fastening hexagon nuts 4 so that the stay 2 is pressed by the bushes 132 and the front attaching leg portions 111.

In the above work, one of the bolt 3 and the hexagon nut 4 is fixed and the other is screwed so as to be fastened, so that a worker is required to use his both hands at the same time to make the workability poor. Further, in a recent vehicle, auxiliary machineries for an engine are increased in spite of the fact that a chamber for housing the engine is made narrow, so that a space around the generator 1 is made small to make the workability further poor, and sometimes there is a vehicle which has no space to insert the hexagon nut 4 and a fastening tool.

FIG. 4 shows another improved conventional example, in which reference numeral 133 designates an attaching-span adjusting bush which is a hollow cylinder and has a screw portion 133a formed in an inner surface thereof and which is pressed into a fitting hole 131a of each of rear attaching leg portions 131 such that the bush 132 is movable in the press-in direction by the fastening force of a bolt 3. In this conventional example, the fixing bolt 3 inserted through respective through holes 111a and 2a formed in each of front attaching leg portion 111 and a stay 2 is merely screwed into the screw portion 133a of the bush 133, so that the workability can be extremely improved. However, each bush 133 is pressed into the fitting hole 131a of the rear attaching leg portion 131 of the generator 1, so that the bush 133 has no back-lash in the circumferential direction. In such a state, in the case where the linearity of the bolt 3 is poor at its portion just under the neck, that is, the bolt 3 is wavy at its shaft portion, abnormal force may be exerted to the screw portion 133a and a screw portion 3a of the bolt 3 because the bush 133 has no back-lash so that a degree of freedom thereof is limited, resulting in poor condition in fastening of the bolt 3. According to circumstances, cracks of the bush 133 or breakage of the screw portions 3a and 133a may be caused.

The conventional setting device for a vehicle generator has problems in that, as described above, the workability is extremely poor, fastening may be poor, the damage may be caused in the bushes, the bolts, etc., and the reliability is not sufficient.

SUMMARY OF THE INVENTION

The present invention has been achieved in order to solve the foregoing problems in the prior art, and an object thereof is to provide a setting device for a vehicle generator in which workability is improved, and reliability is ensured.

The setting device for vehicle generator according to the present invention is arranged such that a bush for adjusting the generator attaching span is fittingly supported in each of attaching leg portions and an attaching nut is housed in the attaching leg portion coaxially with and adjacent to the attaching span adjusting bush with a gap in the radial direction but so as not to be rotatable and removable.

According to the present invention, the nut is housed in each of the generator attaching leg portions so as not to be rotatable and removable, so that it is not necessary to support the nut by hand in fastening the bolt. Further, the nut is housed with a gap in the radial direction, so that the nut may move in the radial direction when a bolt somewhat bent is screwed.

DETAILED DESCRIPTION OF THE PREFERRED EMBODIMENTS

Figure 1:
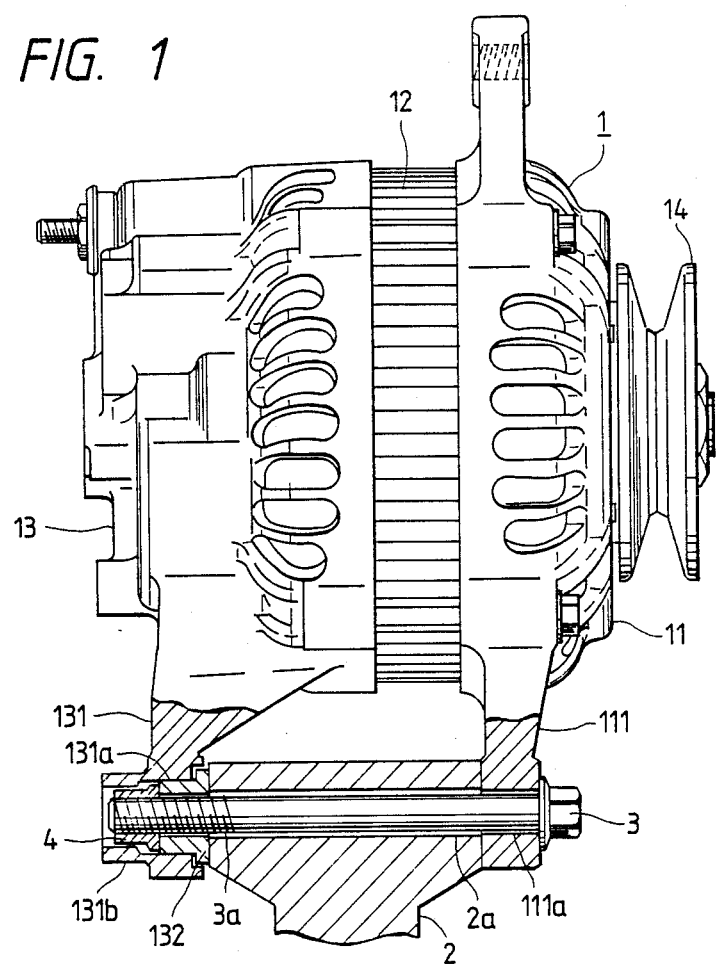
FIG. 1 is a front view partially in longitudinal section of the setting device according to the present invention.
Figure 2A:
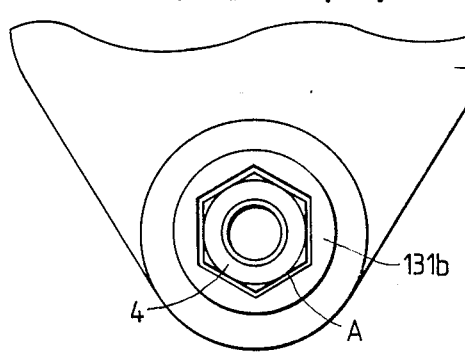
FIGS. 2(A) and 2(B) are a front view and a side view in longitudinal section of a main portion of the setting device according to the present invention, respectively.
Figure 2B:
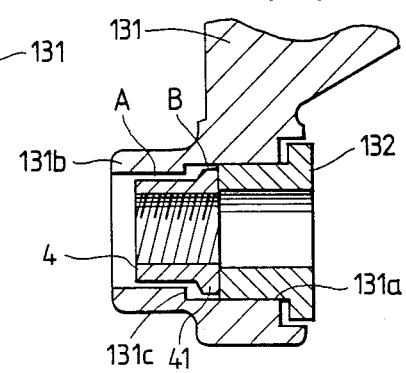
Figure 3:
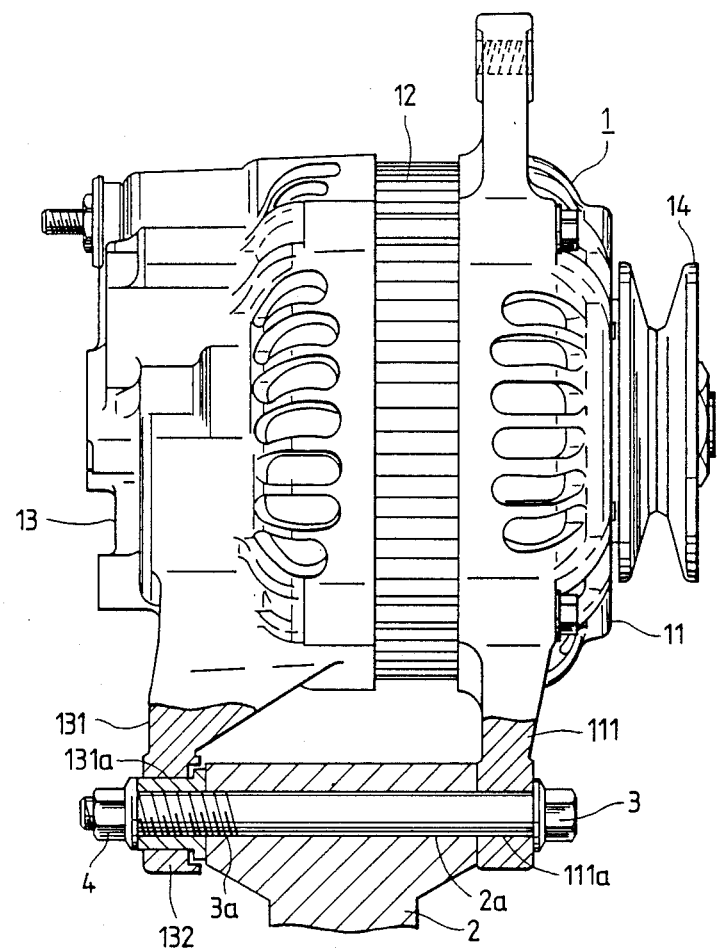
FIG. 3 is a front view partially in longitudinal section of a conventional device.
Figure 4:
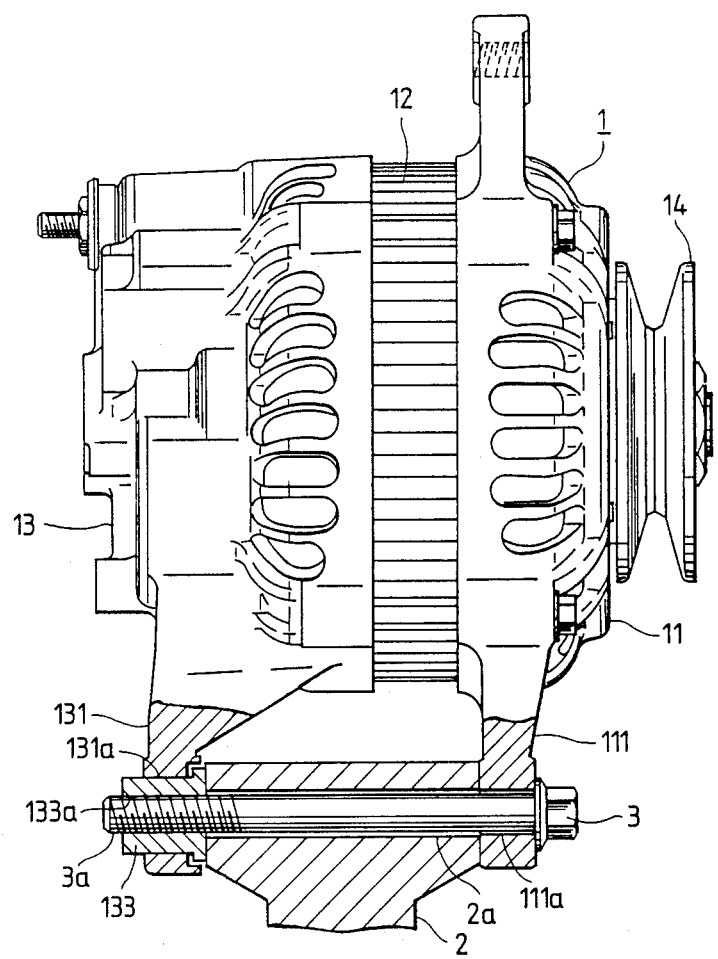
FIG. 4 is a front view partially in longitudinal section of another conventional device.

Referring to the drawings, an embodiment of the present invention will be described hereunder. In FIGS. 1 and 2, reference numeral 131b designates a hexagon tube portion provided on each of rear attaching leg portions 131 and communicated with a fitting hole 131a. A hexagon nut 4 is housed in the hexagon tube portion 131b so as to be coaxially adjacent to a bush 132 fitted in the fitting hole 131a. A gap A is formed between the hexagon nut 4 and the hexagon tube portion 131b, so that the hexagon nut 4 can not rotate but has a certain degree of freedom in the radial direction. A projecting seat portion 41 of the hexagon nut 4 is housed in the fitting hole 131a having a diameter larger than the inner diameter of the hexagon tube portion 131b with a gap B in the radial direction between the seat portion 41 and the fitting hole 131a, so that the hexagon nut 4 is prevented from coming off from the hexagon tube portion 131b by the engagement between the seat portion 41 and a step portion 131c (which is formed between the inner circumference of the hexagon tube portion 131b and the fitting hole 131a).

In the arrangement described above, when a bolt 3 is screwed to the hexagon nut 4 through a through hole 111a of a front attaching leg portion 111, a through hole 2a of a stay 2, and the bush 132, the hexagon nut 4 is fastened to the bolt 3 without pressing the nut by hand because the hexagon nut 4 is housed in the rear attaching leg portion 131 so as not to be rotatable and removable. The bush 132 is therefore moved so that the front attaching leg portion 111 and the bush 132 are urged against the stay 2 to thereby fix a generator 1 on an engine side of a vehicle. Further, the hexagon nut 4 has the gaps A and B in the radial direction, so that even if the linearity of the bolt 3 is not sufficient, the insufficiency can be absorbed by the radial movement of the hexagon nut 4. Accordingly, poor fastening and breakage of the hexagon nut 4 and the bolt 3 never occur.

Although the hexagon nut 4 and the bush 132 are housed in the rear attaching leg portion 131 in the embodiment described above, they may be housed in the front attaching leg portion 111. Although the description has been made with respect to the hexagon nut, the shape of the nut is not limited to hexagon but any shaped nut, for example a square nut, may be used so long as the nut can be housed so as not to be rotatable.

As described above, according to the present invention, the nut to be fastened to the bolt is housed in the generator attaching leg portion so as not to be rotatable and removable, so that it is not necessary to press the nut by hand in fastening the bolt. Accordingly, the operation can be performed by one hand, and the workability is extremely improved. Further, the nut has a degree of freedom in the radial direction, so that even if the linearity of the bolt is insufficient, the insufficiency can be absorbed by the radial movement of the nut. Accordingly, smooth fastening can be performed and abnormal force is not applied to the screw portions, so that breakage of the bolt and the nut can be prevented from occurring.

What is claimed is:

1. A setting device for a vehicle generator, comprising:
    a stay attached to an engine of a vehicle and provided with a first through hole;
    a front attaching leg portion and a rear attaching leg portion of said vehicle generator, both provided on opposite sides of said stay, one of said front and rear attaching leg portions provided with a second through hole and the other provided with a fitting hole and a tube portion;
    a cylindrical attaching-span adjusting bush fitted movably in said fitting hole;
    a nut housed in said tube portion communicating with said fitting hole with a gap between said nut and said tube portion so as not to be rotatable and removable, said nut being coaxially adjacent to said attaching-span adjusting bush; and
    a bolt passed through said second through hole, said first through hole and said attaching-span adjusting bush so as to be fixed in said nut.

2. A setting device as claimed in claim 1, wherein said tube portion has a polygonal shape and said nut has a polygonal shape so that said nut is not rotatable.

3. A setting device as claimed in claim 2, wherein said nut has a seat portion having a larger diameter than said tube portion, said seat portion being housed in said fitting hole with a gap between said seat portion and said fitting hole so that said nut is not removable.

4. A setting device as claimed in claim 2, wherein said tube portion has a hexagonal shape and said nut has a hexagonal shape.

* * * * *